United States Patent [19]

Goffeau

[11] 4,161,023
[45] Jul. 10, 1979

[54] UP-AND-DOWN CHOPPER CIRCUIT

[75] Inventor: Jacques R. Goffeau, Hermosa Beach, Calif.

[73] Assignee: The United States of America as represented by the United States Department of Energy, Washington, D.C.

[21] Appl. No.: 831,302

[22] Filed: Sep. 7, 1977

[51] Int. Cl.$^2$ .............................................. H02M 7/00
[52] U.S. Cl. ................................... 363/124; 307/240; 323/25; 323/22 T
[58] Field of Search ............... 307/240; 318/376, 430; 323/17, 23, 25, 22 T, DIG. 1; 363/18–21, 124

[56] References Cited

U.S. PATENT DOCUMENTS

| 3,093,790 | 6/1963 | Ehret | 323/17 X |
|---|---|---|---|
| 3,177,422 | 4/1965 | Schlereth | 363/124 |
| 3,400,319 | 9/1968 | Stich | 363/19 |
| 3,702,963 | 11/1972 | Donovan | 363/18 |
| 3,748,560 | 7/1973 | Sawa et al. | 363/124 X |
| 4,041,367 | 8/1977 | Gold et al. | 323/DIG. 1 X |

Primary Examiner—William M. Shoop
Attorney, Agent, or Firm—Dean E. Carlson; Stephen D. Hamel; David E. Breeden

[57] ABSTRACT

An improved Up-and-Down Chopper Circuit is provided which is useful for voltage regulation in a bi-directional DC power system. In the down mode, power is switched from a DC power source to a lower voltage energy storing load while in the up mode stored energy in the load is transferred to the higher voltage source. The system uses Darlington transistor switches in a conventional connection. The improvement relates to circuit additions to eliminate the effects of inter-electrode capacitance inherent with this Darlington transistor switching arrangement.

3 Claims, 1 Drawing Figure

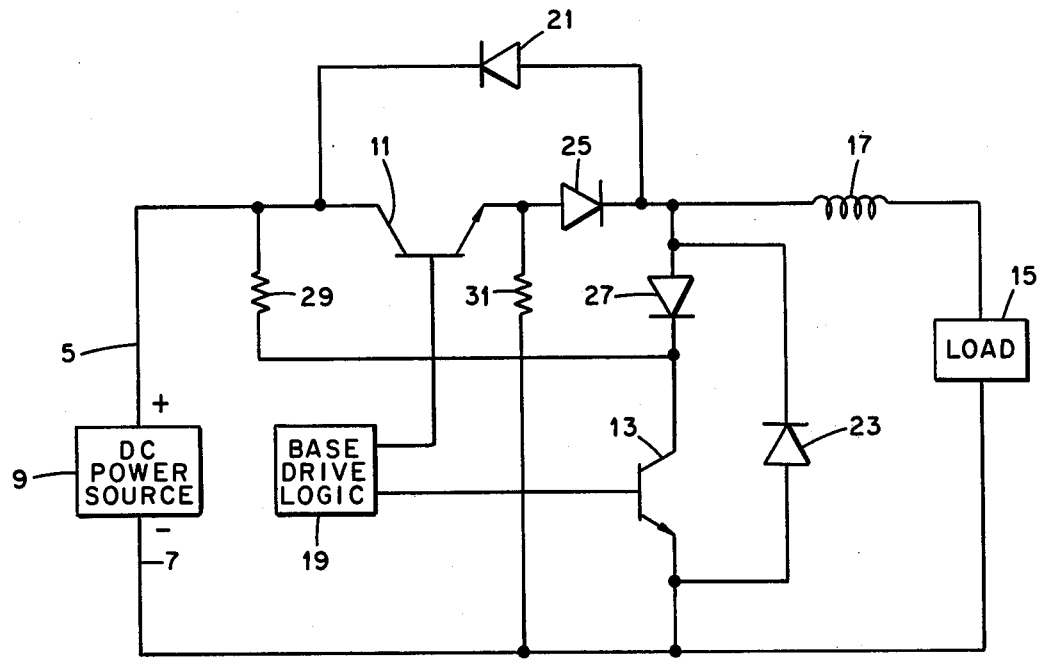

UP-AND-DOWN CHOPPER CIRCUIT

BACKGROUND OF THE INVENTION

This invention was made during the course of, or under, a contract with ERDA.

This invention relates generally to electronic chopper circuits and more specifically to an improved Darlington transistor type "up-and-down" chopper circuit configuration provided with additional circuit elements for eliminating the effects of inter-electrode capacitance inherent with these transistors.

Until recently most inverters have used SCR's as switching elements because they were the only devices available with the necessary high voltage and current ratings. Darlington transistors now offer the high voltage and current ratings needed to provide an alternative in the design of power stage of inverter circuits. Use of Darlington produces a power stage which is significantly smaller in size and weight and is also less costly because of the absence of commutation components. The chopper is connected between a DC source and a load which stores energy. Examples of loads that store energy are: (1) DC motors; (2) DC to AC inverters driving AC motors; and, (3) battery banks in DC link systems.

In the down mode the DC power source provides power to drive the load. The chopper circuitry controls load power consumption by controlling the load voltage. Load voltage is controlled by reducing the voltage available from the DC source, hence the term "down chopper."

The up mode of operation is the regenerative mode. In this mode the load acts as a power source. If the load is a motor, the up mode is the regenerative motor breaking mode. The motor acts as a generator with the inertial energy stored in the motor and its mechanical load providing the motor power. In the regenerative mode, the voltage produced at the load terminals can be less than the DC power source voltage. The chopper circuitry generates an increased voltage from the low voltage, hence the term "up chopper"; this permits the return of power to the DC power source during the regenerative mode.

In the conventional chopper circuit, employing regenerative operation, a pair of solid state switches are employed, such as Darlington transistors, in a series-shunt relationship between the source and the load. A smoothing inductor is connected in series with the load and filters the chopped current produced by the "down" or "up" chopper portion of the circuit. This provides direct current, rather than pulsed current, to or from the load. The transistors are shunted by freewheeling diodes to provide proper current flow in the circuit during chopper operation.

In a circuit configuration of this type, using Darlington transistors, a design problem exists in that these transistors turn "on" when a large step change of voltage (high dv/dt) is applied across the collector and emitter. This phenomenon, which occurs in the absence of base drive, is due to inter-element capacitance.

In the down mode, when the series transistor is rapidly switched "on" and "off", the collector of the shunt transistor is subjected to a positive step change of voltage each time the series transistor is turned "on". This causes the shunt transistor to turn "on" for a short period of time, creating a short circuit across the power source.

During the regenerative mode the shunt transistor is rapidly switched "on" and "off". Thus a step voltage is applied to the series transistor each time the shunt transistor is turned "on". This causes the series transistor to turn "on" for a short period of time, creating a short across the power source.

The unique solution to this problem by means of circuit additions which prevent the unwanted turn on of the shunt transistor in the down mode and the unwanted turn on of the series transistor during the regenerative mode, is the subject of this invention.

SUMMARY OF THE INVENTION

In view of the above, it is an object of this invention to provide an improved Darlington transistor type up-and-down chopper for use in supplying power to an energy storing DC load in a down mode by varying the DC voltage to the load from a DC power source and alternately transferring power stored in the load to the source in the up mode.

Further it is an object of this invention to provide a Darlington transistor type chopper as in the above object wherein the chopper transistors used respectively for the load energizing and load regenerative modes of operation are provided with additional circuit elements in the form of a resistor and an isolation diode for charging the inter-electrode capacitance of the turned-off transistor up to the DC source voltage prior to turn-on of the other transistor, thereby preventing unwanted current flow through the turned-off transistor while the other transistor triggers-on.

Other objects and many of the attendant advantages of the present invention will be obvious from the following detailed description taken in conjunction with the drawing, wherein the single FIGURE is a schematic diagram of an embodiment of an improved Darlington transistor type up-and-down chopper according to the present invention.

DESCRIPTION OF THE PREFERRED EMBODIMENT

Turning now to the drawing, there is shown therein, an improved Darlington transistor type up-and-down chopper circuit configuration of the present invention. The means providing constant magnitude direct current voltage is diagramatically shown as a positive and negative DC lines 5 and 7 respectively supplied by a DC power source 9.

In the basic chopper circuit arrangement, as described above, the Darlington transistors 11 and 13 are connected in a series shunt relationship as shown between the DC power source 9 and the load 15. A smoothing inductor 17 is connected in immediate series with the load 15. The transistors 11 and 13 are switched "on" and "off" according to a preselected or variable time frame by means of a conventional base drive logic circuit 19. Transistor 11 is shunted by means of a diode 21 connected normally between the collector and the emitter of transistor 11 and transistor 13 is shunted by means of a diode 23 which is also normally connected between the collector and the emitter of transistor 13. This arrangement provides the basic chopper operation. However, this circuit includes the basic design problems due to the inherent characteristics of the Darlington transistors as discussed above.

The circuit shown in the drawing includes additional circuit elements for eliminating the adverse effects of inter-electrode capacitance in the Darlington switching transistors 11 and 13 and thus provides the improved up-and-down chopper according to the present invention. The circuit will be described in accordance with the use of NPN transistors 11 and 13 however, it will be obvious to those skilled in the art that a similar circuit may be designed using PNP Darlington transistors as well. In this arrangement the positive lead 5 is connected to the collector of transisitor 11 while the emitter of transistor 11 is connected through an isolation diode 25 to the inductor 17, with the anode of diode 25 connected to the emitter of transistor 11. The freewheeling shunt diode 21 is connected with its cathode to the collector of transistor 11 and its anode to the cathode of diode 25. A further isolation diode 27 is connected between the cathode of diode 25 and the collector of the shunt transistor 13. The anode of diode 27 is connected to the cathode of diode 25 and the emitter of transistor 13 is connected to the negative power lead 7. The free-wheeling shunt diode 23, for transistor 13, is connected with its anode to the emitter of transistor 13 and its cathode to the anode of diode 27. A pull-up resistor 29 is connected between the positive lead 5 and the collector of transistor 13. This insures that the inter-electrode capacitance of transistor 13 is charged to the source voltage when transistor 13 is turned "off", thus preventing unwanted conduction when a positive step voltage is applied to transisitor 13 by transistor 11 being turned "on". A pull-down resistor 31 is connected between the emitter of transistor 11 and the negative source lead 7 to maintain the inter-electrode capacitance of transistor 11 charged so that the emitter of transistor 11 is maintained at the negative source voltage, thus preventing the unwanted turn-on of transistor 11 during the regenerative mode when transisitor 13 is switched "on" and "off".

In the basic operation of the circuit, for the down mode, the load is driven by the DC power source through the down mode chopper transistor 11. In this mode, transistor 11 is switched "on" and "off" at a rapid rate by the control signal applied to the base of transistor 11 from the base drive logic circuit 19 to control the average load current. The duty cycle of this switching controls the average load current. During this mode the "up" chopper transistor 13 must be held "off" prior to turning transistor 11 "on".

The smoothing inductor 17 filters the chopped current produced by transistor 11 to provide direct current, rather than pulsed current, to the load 15. The down mode free-wheeling diode 23 provides a current flow path in the interval between the transistor 11 "on" pulses. The circuit current during the transistor 11 interpulse period flows through diode 23, inductor 17 and the load 15. Current flow during the period that transistor 11 is off is produced by the collapsing field of the inductor 17.

In the regenerative mode, or up mode, the electrical energy produced at the terminals of the load, which may be a DC motor for example, is returned to the DC power source through the chopper circuitry. In this mode, the base drive logic circuit 19 applies base drive pulses to the shunt transistor chopper 13 as in the application of transistor 11 in the down mode. In the case of a motor load, transistor 13 controls braking torque during coast down. During the regenerative mode, transistor 13 is switched "on" and "off" at a rapid rate to control the average current produced by the load. During the regenerative mode operation, the down chopper transistor 11 must be held "off" prior to switching transistor 13 "on". This is performed by the base drive logic circuit 19. The smoothing inductor 17 serves two functions during the regenerative mode. First, it smoothes the chopped current produced by transistor 13 between the "on" pulses; and, second, the collapsing field of conductor 17 produces a voltage at its terminals sufficient to provide power flow back to the source. The up free-wheeling diode 21 permits current to flow into the source from the collapsing field, thereby returning energy to the DC power source. In the interval between the transistor 13 "on" pulses, the inductor produces a high voltage at its terminals causing diode 21 to be forward biased producing a load current path through inductor 17, diode 21 and the DC power source 9.

As pointed out above, the Darlington transistors 11 and 13 used in this circuit configuration will turn "on", even in the absence of base drive, when a large step change of voltage is applied across the collector and emitter. This phenomenon is due to the inter-electrode capacitance, an inherent characteristic of the Darlington transistor. Thus each time transistor 11 is switched on, assuming the basic circuit arrangement without the improvement circuit alterations, the source voltage is applied to the collector of transistor 13 causing it to conduct momentarily to charge the inter-electrode capacitance, an unwanted operational mode in that this shorts the DC power source during the charging period. During the regenerative mode the same phenomenon takes place in transistor 11, creating a short across the power source 9.

The circuit improvements shown in the drawing eliminate the unwanted turn-on of transistor 13 in the down mode and transistor 11 in the up mode. In the down mode, transistor 11 is switched "on" and "off" in the same manner as described above. The base drive logic circuit 19 is arranged so that transistor 13 is always turned "off" at least a few microseconds before transistor 11 can be turned "on". After the transistor 13 is turned "off" its inter-electrode capacitance is charged at a safe rate (low dv/dt) through resistor 29. This pulls up the collector voltage of transistor 13 to the DC source voltage by charging the inter-electrode capacitance through resistor 29 prior to transistor 11 turn-on. Thus, the collector of transistor 13 is not subjected to a positive step change of voltage when transistor 11 turns "on", and transistor 13 remains "off". Isolation diode 27 prevents unwanted charging current flow into the load when transistor 11 is turned "off".

In the up mode the inter-electrode capacitance of transistor 11 is charged through resistor 31 by pulling its emitter voltage down to the negative source voltage so that when transistor 13 is switched "on" a high step voltage is not applied to transistor 11 causing it to momentarily turn on and short the power source. The isolation diode 25 prevents unwanted charging current flow from the source through the load when transistor 13 is turned "off". Transistor 11 is always turned "off" at least a few microseconds before transistor 13 can be turned "on" to allow charging of the inter-electrode capacitance of transistor 11.

Thus it will be seen that an improved up-and-down chopper circuit employing the many advantages of Darlington transistor switches has been provided with very simple and inexpensive circuit additions to an otherwise conventional chopper circuit arrangements which eliminates the effects of inter-electrode capacitance inherent with these transistors operated in this manner. By charging the inter-electrode capacitance of the turned-off transistor up to the DC source voltage prior to turn-on of the other transistor, unwanted current flow through the turned-off transistor when the other transistor triggers-on is prevented. It will be obvious to those skilled in the art that various modifications and changes may be made in the disclosed embodiment without departing from the spirit and scope of this invention as set forth in the following claims attched to and forming a part of this specification.

What is claimed is:

1. In a Darlington transistor type "up-and-down" chopper for regulating a DC voltage from a source supplying energy to an energy storing load in a "down" operating mode and alternately transferring energy stored in said load to said source in an "up" operating mode including first and second Darlington transistors connected in a series-shunt relationship, respectively, between said source and said load, an inductor connected in immediate series with said load for smoothing the chopped current flowing through said load, a base drive logic circuit means for supplying base drive signals to the base electrodes of said first and second transistors to switch said first transistor "on" and "off" at a selected rate when said chopper is operating in said down mode and switching said second transistor "on" and "off" at a selected rate when said chopper is operating in said up mode, a first free-wheeling diode connected in parallel with the series connected inductor and load for maintaining conduction of current through said load in the down mode during the time said first transistor is switched "off" and a second free-wheeling diode connected between said source and said series connected inductor and load for conducting current from said load to said source in said up mode during the time said second transistor is switched "off", the improvement comprising:

a first charging circuit means for applying the DC source voltage between the collector and emitter electrodes of said second transistor to charge the inter-electrode capacitance of said second transistor to prevent conduction through said second transistor when said first transistor is turned "on", and a second charging circuit means for applying the DC source voltage between the collector and emitter electrodes of said first transistor to charge the inter-electrode capacitance of said first transistor to prevent conduction through said first transistor when said second transistor is turned "on".

2. In a Darlington transistor type "up-and-down" chopper as set forth in claim 1 wherein said first charging circuit means includes a first resistor connected between the positive side of said source and the collector electrode of said second transistor, said second transistor emitter connected to the negative side of said source, and a blocking diode connected in immediate series with said collector of said second transistor for blocking inter-electrode capacitance charging current applied to said second transistor through said first resistor from passing through said load, and wherein said second charging circuit means includes a second resistor connected between the negative side of said source and the emitter of said first transistor, said first transistor collector connected to the positive side of said source, and a second blocking diode connected in immediate series with the emitter of said first series transistor for blocking inter-electrode capacitance charging current applied to said first transistor through said second resistor from passing through said load.

3. In a Darlington transistor type "up-and-down" chopper as set forth in claim 2 wherein said base drive logic circuit means includes first and second outputs connected to the base electrodes of said first and second transistors, respectively, for supplying base drive signals according to the selected one of said operating modes to switch said transistors "on" and "off" in accordance with maintaining a desired load voltage and preventing the application of a base drive signal when switching from one of said operating modes to the other of said operating modes for a period sufficient to charge the inter-electrode capacitance of the operating one of said transistors for said one operating mode prior to operating said chopper in said other operating mode.

* * * * *